A. ADAMS.
PROCESS FOR EXTRACTING SUCROSE FROM SUGAR CANE.
APPLICATION FILED AUG. 25, 1915.
1,265,582.
Patented May 7, 1918.
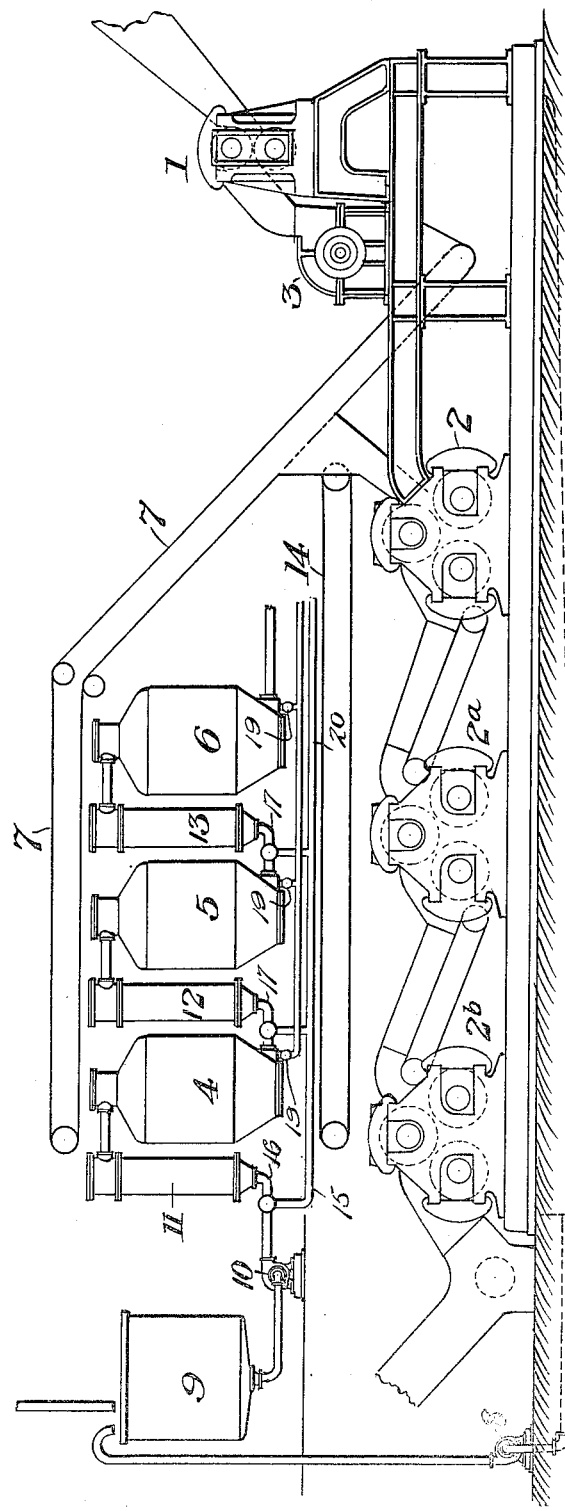

UNITED STATES PATENT OFFICE.

ANDREW ADAMS, OF KAHUKU, TERRITORY OF HAWAII.

PROCESS FOR EXTRACTING SUCROSE FROM SUGAR-CANE.

1,265,582.

Specification of Letters Patent.

Patented May 7, 1918.

Application filed August 25, 1915. Serial No. 47,243.

*To all whom it may concern:*

Be it known that I, ANDREW ADAMS, a citizen of the United States, residing at Kahuku, in the county of Honolulu and Territory of Hawaii, have invented certain new and useful Improvements in Processes for Extracting Sucrose from Sugar-Cane; and I do hereby declare the following to be a full, clear, and exact description of the invention, such as will enable others skilled in the art to which it appertains to make and use the same.

This invention relates to a process for the extraction of sucrose from sugar-cane.

In sugar-cane mill work, the cane is usually passed through a crusher previous to being fed to the first mill of a train of mills arranged in tandem, and this crusher not only extracts a large proportion of the juice but prepares the cane for the mills. More recently, a shredder or disintegrator, hereinafter called the shredder, has been introduced between the crusher and the first mill. This shredder receives and distintegrates the crushed cane from the crusher, so as to better prepare the product of the crusher for the extraction of cane juices by the succeeding mills.

The present invention relates to a new method of treatment of this shredded or disintegrated cane, the product of the shredder, previous to its being fed to the first mill. It contemplates, using a part or all of this shredded or disintegrated cane as a filtration medium, through which cane juice from the mills is passed, said juice being heated to a temperature of not less than 212 degrees F., and containing a suitable quantity of a clarifying reagent. The cane juice may be either diluted or undiluted. Lime or other suitable clarifying reagents may be employed.

The purposes of my process are: (*a*) the filtering of the cane juice; (*b*) the fixing of impurities in the shredded or disintegrated cane which has been used as a filtering medium; (*c*) the extraction of sucrose from the shredded or disintegrated cane; and (*d*) the elimination, at least in part, of the filter or mud presses usually employed.

The accompanying drawing, forming a part of this specification, illustrates diagrammatically one arrangement of apparatus for carrying out my process.

Referring to the drawing, 1 represents the crusher, 2 the first three-roller sugar-cane mill of the train, and 3 the shredder interposed between the crusher 1 and the first mill 2.

The cells 4, 5 and 6 are each adapted to hold disintegrated or shredded cane from the shredder 3, the conveyer 7 being provided for conveying the product of the shredder 3 to any one of the said cells.

The strained juice resulting from the mills 2, $2^a$ and $2^b$, is pumped by the pump 8 into the tank 9, where a suitable quantity of a clarifying reagent, such as lime for example, is mixed with said juice. If desired, water may also be added to this juice to dilute the same in addition to the dilution due to the usual maceration applied to the mills.

The limed juice from the tank 9 is pumped by the pump 10 through one of the heaters 11, 12 or 13, in which the limed juice is heated to at least 212 degrees F. This heated limed juice is then passed through one of the cells 4, 5 or 6 containing some of the product of the shredder 3, this shredded or disintegrated cane acting as a filtration medium. During its passage through this cell, the heated and limed juice not only takes up sucrose from the shredded or disintegrated cane in this cell, but also fixes impurities in the said shredded or disintegrated cane. Having been used for a sufficient period of time as a filtration medium, the shredded or disintegrated cane is discharged from this cell and is conveyed by the conveyer 14 and fed to the first mill 2.

Not less than three cells are employed, in order that one may be filling with product from the shredder 3, at least one may be filtering, and one discharging, simultaneously.

This may be accomplished by extending the pipe 15 from the pump 10 and connecting it to each of the heaters 11, 12 and 13 by valved pipes 16, 17 and 18, the latter two also serving to connect the adjacent diffusion cells to the heaters and the valves therein being of the three-way type so that the juices may be permitted to flow from the diffusion cell 4 through the heater 12, the diffusion cell 5, the heater 13 and the diffusion cell 6, or from the diffusion cell 5 and the heater 13 into the diffusion cell 6. Of course, these valves may be turned so as to permit the juices to pass through all of the diffusion cells or any one or more of the same. Extending from the lower end of each of the cells is a valved pipe 19, which is connected to a common juice outlet 20. By means of these pipes 19, the juice may be drained from the cells as desired.

I claim:

1. In apparatus of the class described, the combination with a crusher and a shredder, of a liming tank, means for conveying juice from the shredder to the tank, a heater, a diffusion cell connected to said heater, means for conveying the juice from the liming tank to the cell, a mill, and means for conveying the shredded cane from the cell to the mill.

2. In apparatus of the class described, the combination with a shredder, of a liming tank, a diffusion cell and a mill, the shredder being arranged to discharge juice into the liming tank and to discharge cane into the cell, the mill being arranged to discharge juice into the liming tank, the liming tank being arranged to discharge juice into the cell, and the cell being arranged to discharge cane into the mill.

3. In apparatus of the class described, means for crushing and shredding the cane, means for separating the shredded cane from the juice which is freed by the crushing and shredding means, means for receiving the cane from the shredder, means for receiving the cane from the last mentioned means and for freeing the juice therefrom, the first mentioned receiving means being constructed and arranged to receive the juice from the last mentioned receiving means and for filtering said juice.

4. In apparatus of the class described, the combination with a crusher and a shredder, of a battery of mills, a battery of diffusion cells, means for conveying cane from the shredder to any of the cells, means for conveying juice from the shredder and from the mills to the cells, and means for conveying cane selectively from the cells to the first mill of the battery.

In testimony whereof I affix my signature, in presence of two witnesses.

ANDREW ADAMS.

Witnesses:
D. B. MURDOCK,
ROBT. J. PRATT.